Dec. 3, 1940.  J. M. WITHEY  2,223,475
FISH LURE
Filed Sept. 27, 1937

Inventor
John M. Withey
By
Attorneys

Patented Dec. 3, 1940

2,223,475

UNITED STATES PATENT OFFICE 2,223,475

FISH LURE

John M. Withey, Howell, Mich., assignor to Leora M. Wickman, Howell, Mich.

Application September 27, 1937, Serial No. 165,870

1 Claim. (Cl. 43—48)

The present invention relates to artificial bait or fish lures of the type adapted to be drawn through the water as by casting or trolling.

The primary object of the invention is to provide an artificial bait or lure which when drawn through the water has the appearance of an insect such as a beetle.

Another object of the invention is to provide a lure construction such that when it is drawn through the water its movements are peculiarly irregular and attract fish as a result thereof. To this end the lure is constructed by forming the body thereof on the shank of a hook, the hook prong being disposed above the main axis of the body, and the center of gravity of the body being below the hook shank when the lure is horizontally positioned. Mounted upon the forward end of the hook is a spinner, retained thereon by the eye which receives the leader. The body is preferably formed of lead and is molded upon the hook shank and it has been found that mounting both the body and the spinner on the shank of the hook results in a peculiar motion when the lure is drawn through the water. This motion is radically different and has been found to be much more effective than when the spinner is mounted upon a leader in advance of the lure or when it is connected to the lure by a swivel.

To the rear of the lure, and covering the hook, is provided a fan shaped "feather" composed preferably of tufts of hair. The fan shaped "feather" is disposed vertically, as is the hook prong, and it functions to oppose rotation of the lure with the spinner when it is drawn through the water. Due to the mounting of the body and the lure on the hook shank, and the disposition of the center of gravity in combination with the fan shaped "feather," the resulting movement is peculiarly erratic and has the ability to attract fish.

With the above and other ends in view, the invention is more fully disclosed with reference to the accompanying drawing, in which Figure 1 is a side elevation;

Like characters of reference are employed throughout to designate corresponding parts.

Figure 3:
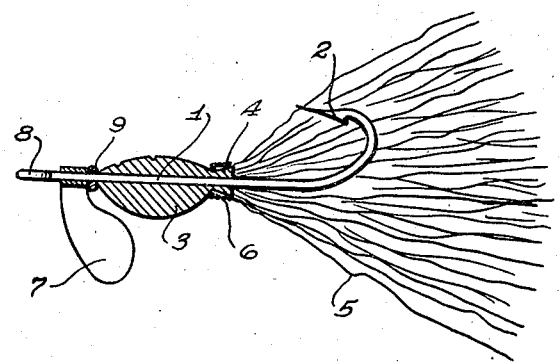
Fig. 3 is a longitudinal vertical section.
Figure 4:
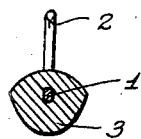
Fig. 4 is a transverse vertical section.

The numeral 1 designates the shank of a hook having the usual prong 2. Cast upon the shank of the hook is a metal body 3, preferably of lead. The body 3 is, in the man portion, streamlined and is so proportioned and disposed with respect to the shank that its center of gravity is below the hook shank. At its rear end, the body 3 is provided with a flared portion 4 and a fan shaped "feather" 5, composed of tufts of hair, is secured thereon by a binding 6. When the lure is horizontally disposed as shown in Figures 1 and 3 the fan shaped "feather" extends vertically, as also does the hook prong.

Figure 1:
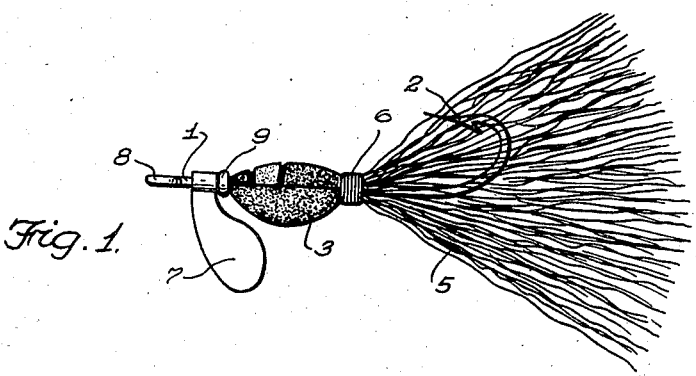
Figure 2:
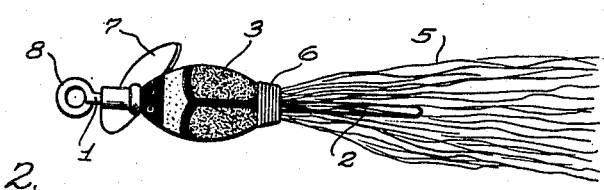
Fig. 2 is a top plan view.

The body 3 is marked with contrasting colors and, as may be seen in Figures 1 and 2, has certain characteristic marks which tend to give it the appearance of a beetle when it is drawn through the water.

The hook shank 1 extends outwardly in advance of the body 3 and has a spinner 7 mounted thereon to rotate due to impingement of water thereagainst. The swivel is retained upon the shank 1 by an eye formation 8 which also provides means for attaching a leader to the lure. A thrust bearing 9 is provided between the lure body 3 and the spinner 7 so that friction which might cause the lure body to rotate with the spinner is eliminated.

As mentioned above, mounting the body 3 and the spinner 7 on the hook shank, in combination with the disposition of the center of gravity and the fan shaped "feather" results in an erratic motion which is peculiarly attractive to fish.

Although a specific embodiment of the invention has been illustrated and described it will be understood that various changes may be made within the scope of the appended claim without departing from the spirit of the invention, and such changes are contemplated.

What I claim is:

A fish lure comprising, a fish hook having a shank, an elongated tapering weight member surrounding a portion of said shank intermediate the ends of the hook and secured thereto, said weight member having its center of gravity offset vertically below said shank, a spinner mounted on said shank in advance of said weight member, said shank having an eyelet on its forward end to retain said spinner on said shank, a thrust bearing interposed between said spinner and said weight member, said weight member having a flared portion immediately adjacent the rear end thereof, a plurality of hairs at the rear of said weight member, said hairs extending horizontally longitudinally of said weight member a distance substantially twice the length of said weight member, said hairs extending vertically longitudinally of said weight member in a fan-like formation both above and below the axis of the shank, said hairs extending horizontally transversely of said weight member on both sides of said hook, and threads wrapped around said hairs and the flared portion of said weight member.

JOHN M. WITHEY.